(12) United States Patent
Lenard

(10) Patent No.: US 12,221,136 B1
(45) Date of Patent: Feb. 11, 2025

(54) SYSTEMS AND METHODS FOR UTILIZING TERRAIN

(71) Applicant: Roger X. Lenard, Edgewood, NM (US)

(72) Inventor: Roger X. Lenard, Edgewood, NM (US)

(*) Notice: Subject to any disclaimer, the term of this patent is extended or adjusted under 35 U.S.C. 154(b) by 0 days.

(21) Appl. No.: 18/539,248

(22) Filed: Dec. 13, 2023

(51) Int. Cl.
*B61B 12/02* (2006.01)
*B64G 1/16* (2006.01)

(52) U.S. Cl.
CPC ............. *B61B 12/02* (2013.01); *B64G 1/16* (2013.01)

(58) Field of Classification Search
CPC .................................. B61B 12/02; B64G 1/16
See application file for complete search history.

(56) References Cited

U.S. PATENT DOCUMENTS

| 10,920,434 B1* | 2/2021 | Pearson, Jr. ............ E04G 21/22 |
| 2023/0349282 A1* | 11/2023 | McNeill ................ E21B 49/003 |

* cited by examiner

*Primary Examiner* — Robert J McCarry, Jr.
(74) *Attorney, Agent, or Firm* — Outer Space IP

(57) ABSTRACT

Systems and methods for utilizing a terrain are disclosed. Two vehicles, each with a mast consisting of a shaft and an auger are provided. The auger attaches to the surface to stabilize the mast. The shaft is attached to a set of cables that run between the two vehicles. Support poles traverse the cables and stabilize the cables. A utilization device travels the cables and utilizes the terrain.

19 Claims, 6 Drawing Sheets

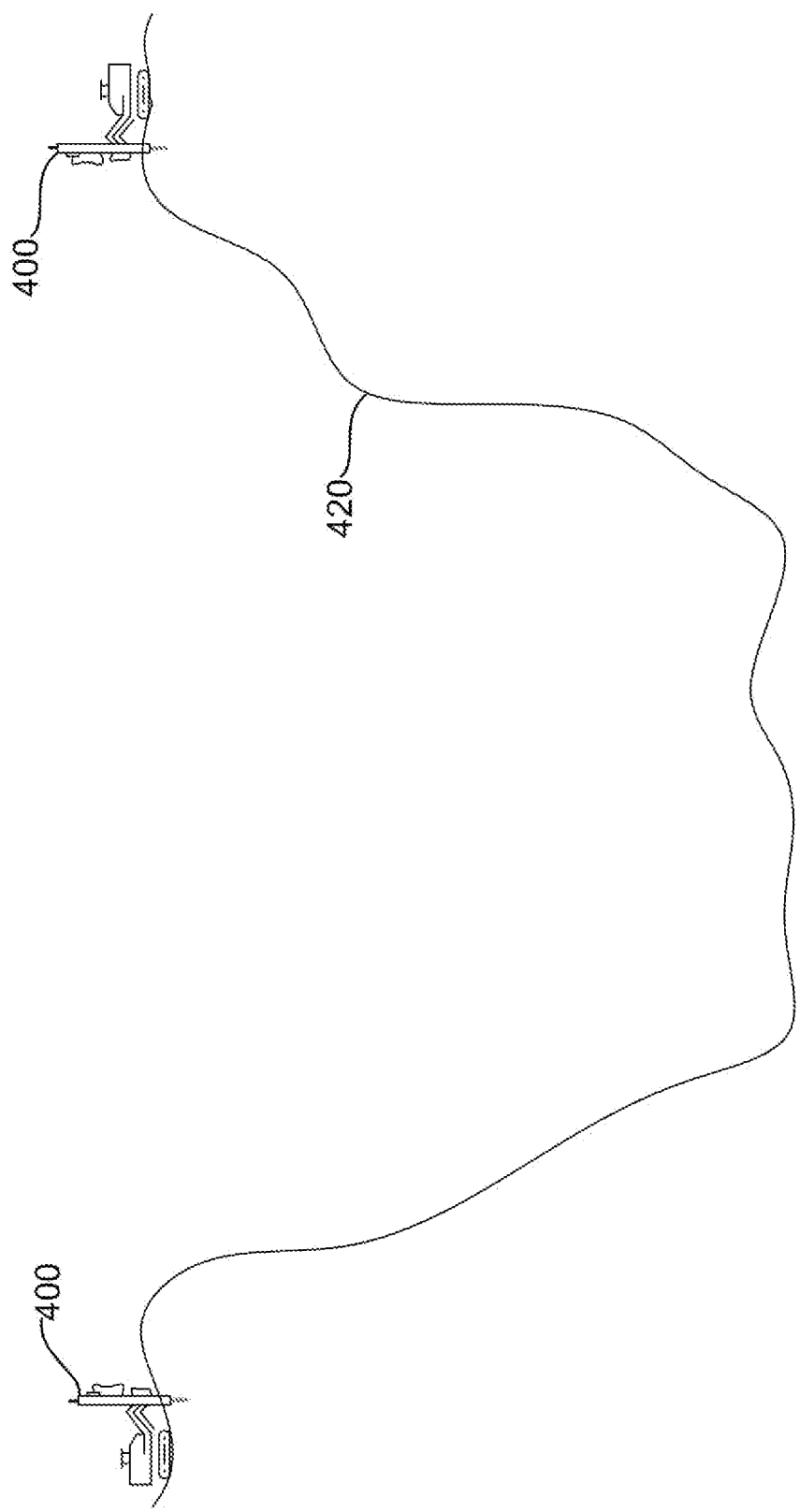

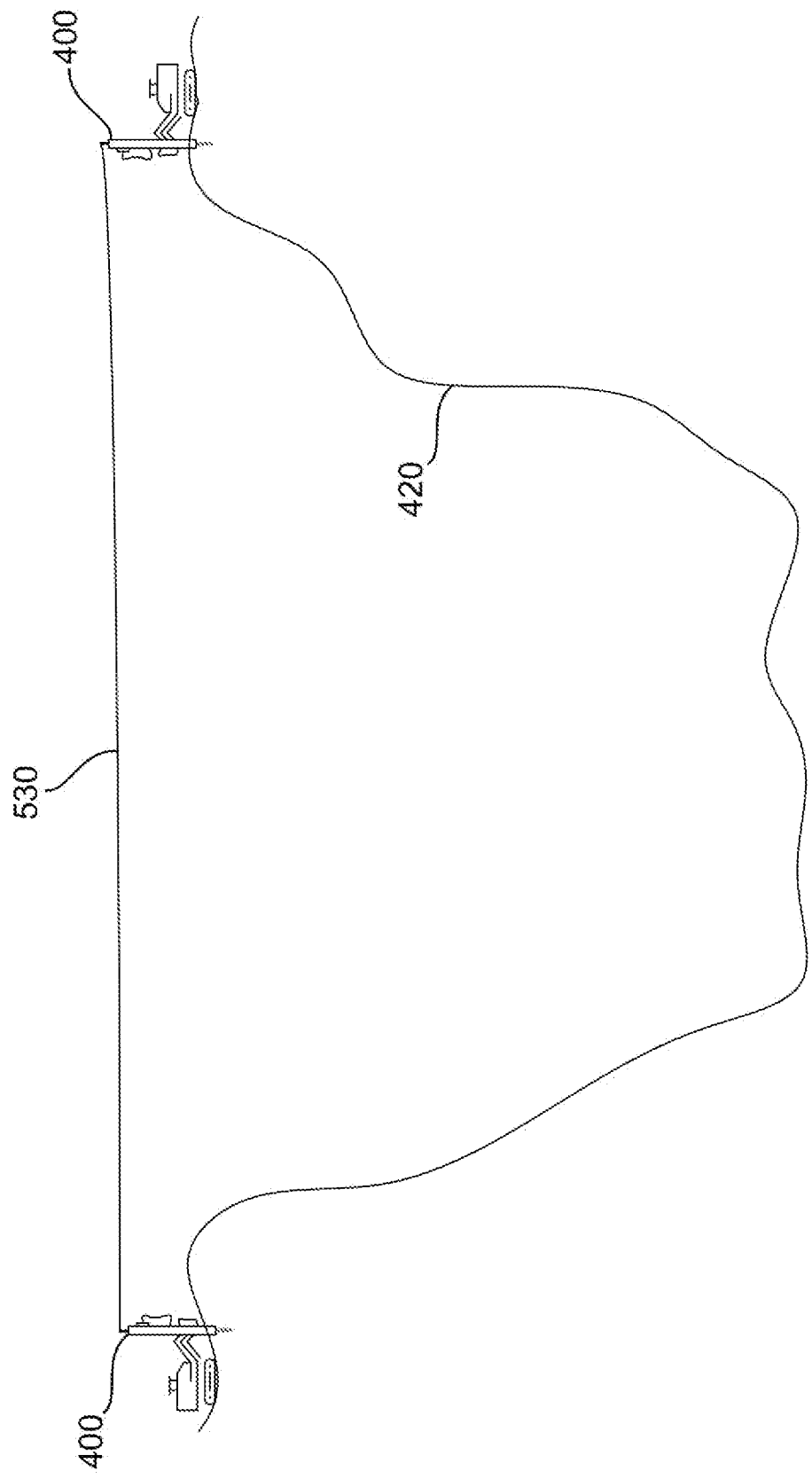

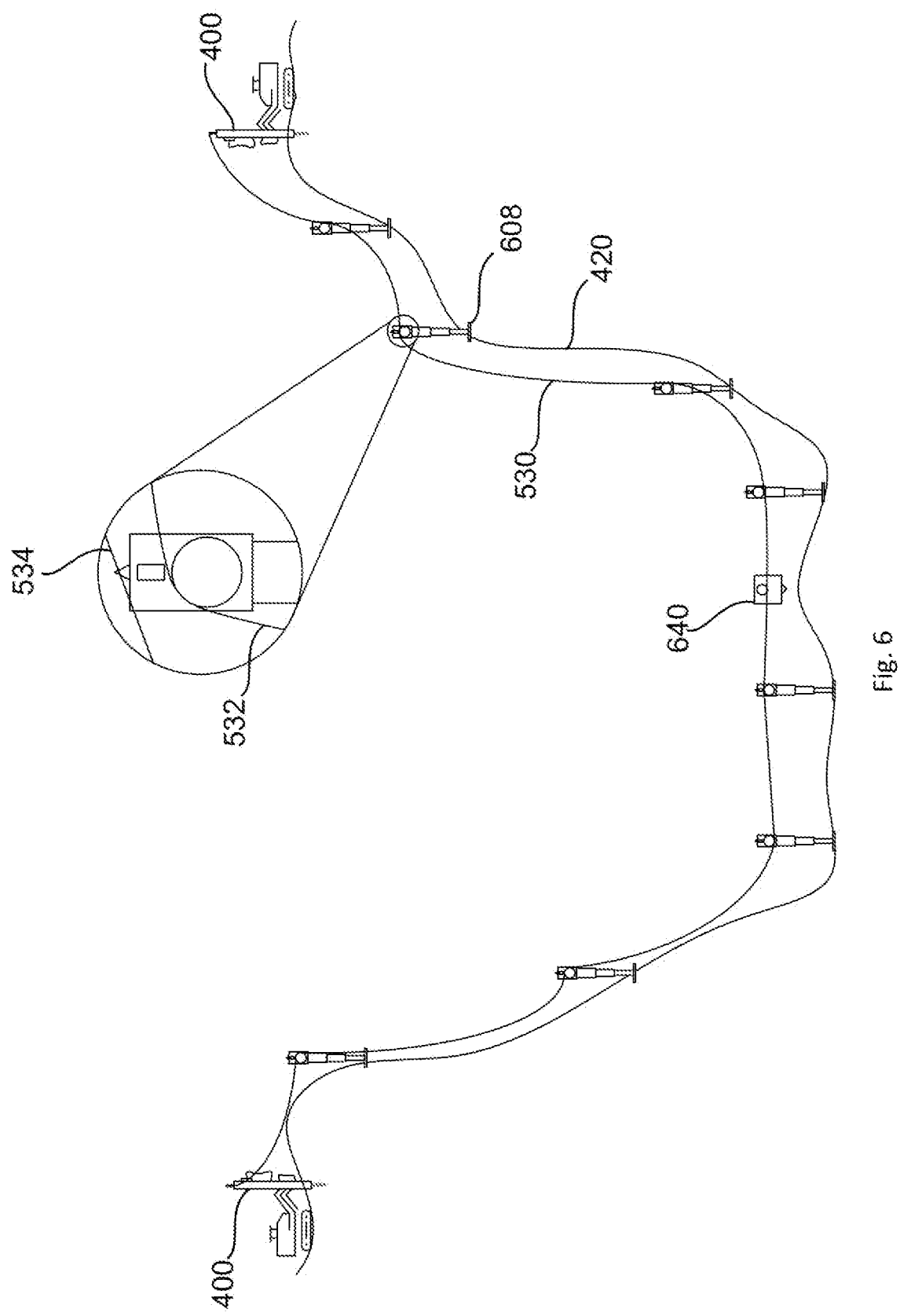

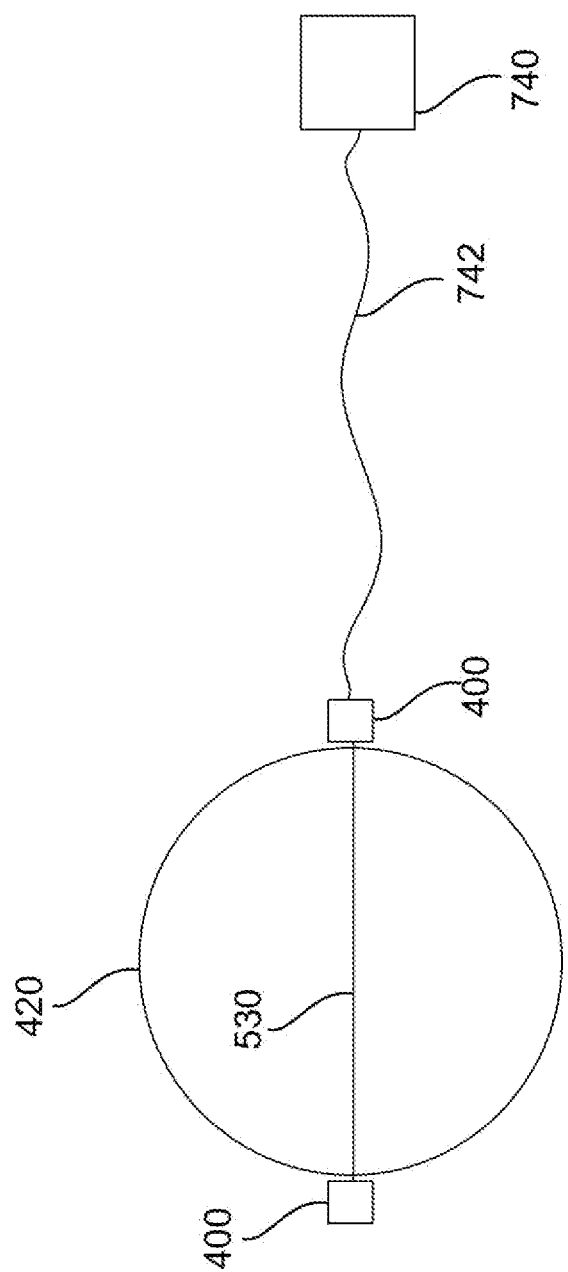

SYSTEMS AND METHODS FOR UTILIZING TERRAIN

BACKGROUND OF THE INVENTION

While much of the Apollo information related to the lunar surface experiencing typical diurnal conditions, there were some small locations which were permanently shadowed at the Apollo 13, 16, and 17 landing sites. There are even larger permanently shadowed regions at the poles of the moon. Traversing these would be of great benefit to scientific and engineering knowledge.

TECHNICAL FIELD

This disclosure relates generally to terrain utilization.

SUMMARY

In a first aspect, the disclosure provides a system for utilizing terrain. Two vehicles are configured to traverse the terrain to two locations, the two vehicles each having a mast, the mast having a shaft and an auger. Each of the augers are configured to auger into the terrain and thereby stabilize each of the masts against forces on each of the shafts by a support cable and a transport cable. The support cable is configured to extend between the two shafts. The transport cable is configured to extend between the two shafts. Support poles carried by the two vehicles are configured to attach to the support cable and the transport cable and travel along the support cable and the transport cable to a desired location. The support poles telescope until the support poles contact the terrain. In this manner, the support poles provide support to the support cable and the transport cable. A utilization device is configured to travel the support cable and transport cable and is further configured to utilize the terrain as the utilization device travels.

In a second aspect, the disclosure provides a method for utilizing a terrain. Two vehicles are provided, each having a mast with a shaft and an auger. The augers auger into the ground, thereby stabilizing each of the masts against forces on each of the shafts by a support cable and a transport cable. A support cable is extended between the two shafts. A transport cable is extended between the two shafts. Support poles are attached to the support cable and the transport cable. The support poles are passed down the support cable and the transport cable to a point or points between the two shafts. The support poles are telescoped to extend until the support poles contact the terrain and thereby support the support cable and the transport cable. A utilization device is passed along the support cable and the transport cable such that the utilization device travels to a desired point between the two shafts.

Further aspects and embodiments are provided in the foregoing drawings, detailed description and claims.

BRIEF DESCRIPTION OF DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 4 is a cutaway side view of a crater with two of the vehicles of FIG. 2.

FIG. 5 is the cutaway side view of FIG. 4 with a set of cables spanning between the two vehicles.

FIG. 6 is the cutaway side view of FIG. 5 with the telescoping support poles of FIG. 3 and an exploration device.

FIG. 7 is a schematic top view of the crater of FIG. 4 with a power plant.

DETAILED DESCRIPTION

Figure 1:
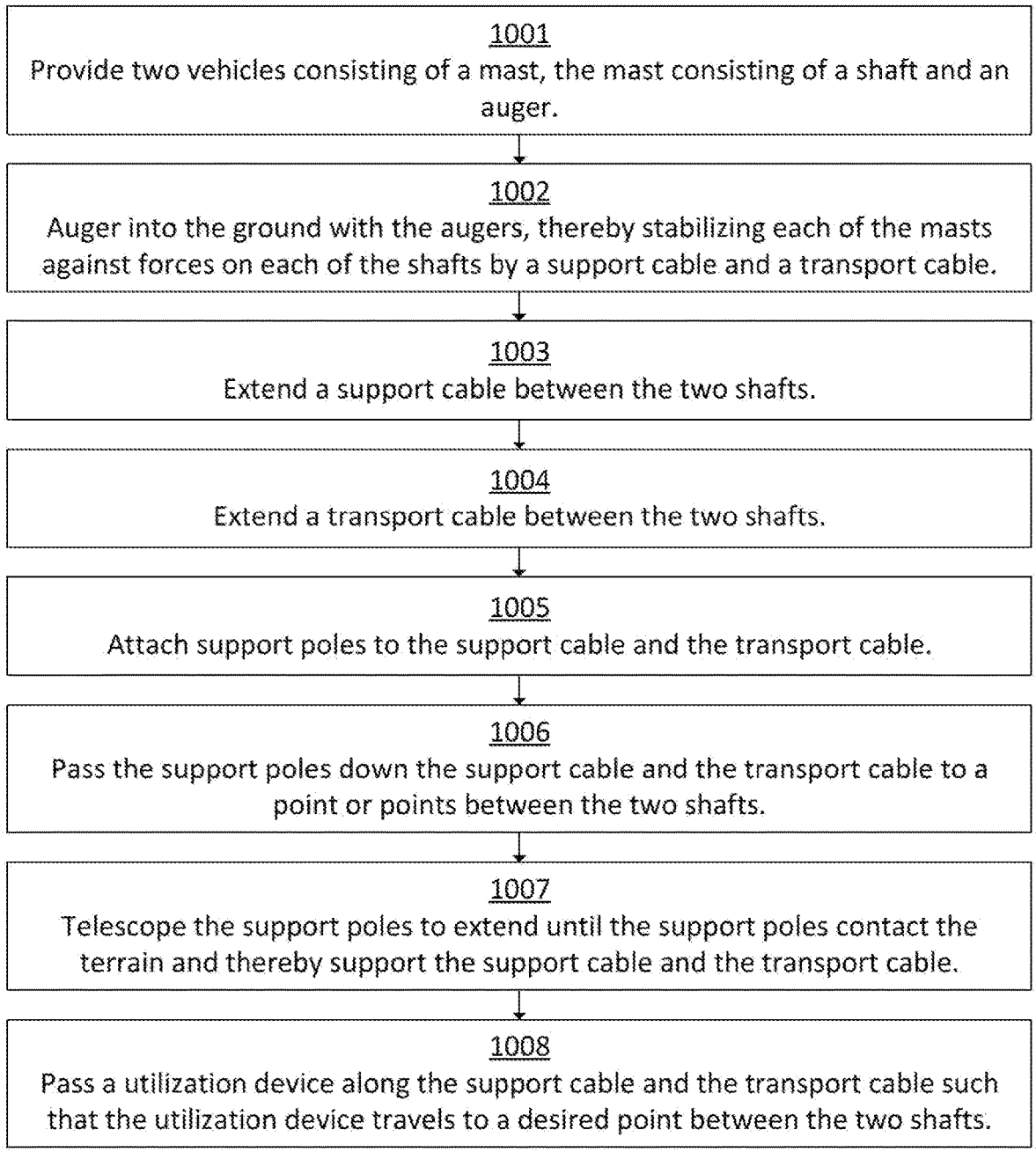
FIG. 1 is a block diagram showing a method for utilizing a terrain.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, utilizing is meant to refer to prospecting, excavating, mining, processing, exploring, cataloguing, classifying, surveying, providing infrastructure, and combinations thereof.

Remote prospecting and mining of the permanently shadowed regions (PSRs) of the lunar poles without large-scale equipment permanently or semi-permanently placed in the PSRs is of interest to the space community.

While much of the Apollo information related to the lunar surface experiencing typical diurnal conditions, there were some small locations which were permanently shadowed at the Apollo 13, 16, and 17 landing sites. Samples were gathered from the PSR regions, and the Apollo astronauts noted no observable differences in the shadowed soils. One such PSR was examined by Apollo 16 astronauts Young and Duke. The PSRs examined by the Apollo astronauts have been shadowed for substantial time; location 76240 appears to have been in the PSR configuration for 22 million years. Laboratory measurements indicated enhanced volatile abundances. A number of areas in and in close proximity to some PSRs were examined by the Apollo 17 astronauts. In the vicinity of location 76240, a nearby meteor impact ~65,000 years ago added material to the original regolith.

One seminal question is whether or not regolith properties can differ in the Permanently Shadowed Regions versus more diurnally exposed regions. Diurnal variations in observed temperatures have been measured at less than 6 K in the upper 30-70 cm of regolith. The data are consistent for the various Apollo landing sites, so there is relatively little variation once below the highly variable upper surface temperatures. Below ~50 cm, steady temperature gradients are regulated by internal heat flow. This would suggest that any physical effect caused by lack of the daily heating/cooling system would be limited to the first 50 cm of regolith.

Because the PSR are very cold and are absent sunlight (except for scattered light from crater walls), they are considered potential sites for deposition and retention of volatile substances such as water ice and ammonia. Icy materials could potentially be deposited in several as yet untested forms. From the perspective of a commercially viable enterprise, the objective would be to determine the depth and assay of any volatile deposits. A typical lunar Highland regolith breccia may be Feldsparic, submature, and friable, with an estimated porosity of ~30%, and a bulk density of ~2 gm/cc. These formations have some interesting properties for retention of volatiles.

The volatiles appear to be able to be trapped in the Highland breccia. Water ice might be contained in the breccia within the interstices of the pores in the regolith. Presumably this could be due to water entering the liquid state (very briefly) during the impact. The porosity of the native breccia is reduced, and due to the momentary liquid phase, the breccia partially cements. This would tend to enhance cohesion and load bearing capability of the regolith, while at the same time making it somewhat more difficult to penetrate.

Another potential model is for the object containing the volatiles to impact without the volatile liquefying. It is likely that the volatile ice would shatter resulting in shards of material mixed in with the regolith. The reality is there are still many unknowns. Despite the panoply of landers and human missions and the vast array of successes, the polar PSRs have not enjoyed surface exploration. The LCROSS experiment and new observations from a later generation of orbiting assets seems to indicate that the polar PSR surface may exhibit unusually high porosity soil or regolith. Without ground truth it will be very difficult to propose realistic ISRU activities. Certainly, without realistic surface analysis and some in-depth assays being conducted, basing a commercial model for development of a propellant depot system using lunar materials is unrealistic.

In one embodiment, an exploration or utilization device may consist of a plurality of crawlers which contain a number of elements. The term crawler is used in the broadest definition of any form of (typically) self-propelled vehicles. The crawlers may be wheeled or tracked. The devices must have a form of positive mobility. The crawler may be electrically powered by a remote nuclear reactor with electricity transferred through wires, or possibly by power beaming. One concept is for the tracked vehicle to have a plurality of internal or external motors. The motors may be used to move the tracked vehicle, to operate the stabilization auger. The mast of the system may contain a plurality of pulleys and cables. The pulley and cable systems are operated by the electric motors and allow the crawler to perform prospecting and excavation tasks.

The crawler mast may have mounted to it a movable vertical shaft which is connected to a drive motor which drives a regolith penetrating auger. The purpose of this mechanism is to auger deep (several feet or more), to stabilize the mast against forces exerted on it by the support cable and the transport cable are attached. For embodiments involving prospecting in the PSRs of the craters at the lunar poles, the crawlers may operate in pairs, one on each side of the crater. The system operates two cables between the two crawlers. This includes a support cable and a transport cable.

The support cable and the transport cable may also be electrical conductors, providing power to a variety of useful attachments. One of the attachments may be a telescoping support pole. A plurality of support poles may be carried by the crawler. During operations when the cable is strung in a given location, the first act is to have a robotic arm grasp one of the telescoping support poles and affix its pulley arrangement to the support cable. A lower clasp on the telescoping support pole grasps the transport cable. The pulley and the clasp make electrical contact with their respective cables and are insulated for each other. The transport cable draws the telescoping support pole to a position a calculated distance from the mast where electrical power from the cables is used to telescope the support pole until the support pole base contacts the surface of the PSR. A plurality of the support poles is used to uphold the support cable against the weight of the prospecting module or the drag line.

The support pole may consist of a plurality of telescoping structural segments which can be extended or retracted by a drive motor to lengthen or shorten the support pole. Affixed to the lowest (smallest) segment is a base pad, which can articulate the match the regolith surface conditions and provide a large base to support the weight of the support pole and any payload which may be carried by the support cable. Attached to the (approximate) middle of the topmost telescoping segment is a pulley on which the transport cable will move either toward or away from one of the crawlers to move a payload across the interior of the PSR regions of a crater similar to the arrangement used for trams or ski lifts. The topmost telescoping segment of the telescoping support pole has an electromechanically actuated clasp which grasps the support cable as it is extended across the interior gap of the PSR crater. The clasp is held into place on the support cable when the electromagnetic actuator closes. As the crawlers move along the rime of the crater from one end of the crater, where the crawlers are close to each other as the crawlers proceed along the rim of the crater, the cables enter the interior region of the crater. One of the crawlers attaches a prospecting system onto the support cable; the transport cable attaches to the prospector and moves it along the support cable until it is in a position to collect a sample. A sample collector is ejected from the prospector and the sample pouch is retrieved and stored. When the distance between the crawlers is large enough that the cable sag becomes an issue, one of the crawlers releases a telescoping support which is dragged to the middle of the support cable, (for the first support). Subsequent supports are brought into position by the transport cable. When the support is in position, the clasp firmly engages the support cable to retain its position. When the support is in position, the support's drive motor extends the telescoping support until the support pad contacts the PSR surface. The prospector is pulled along the support cable, stopping to take a sample intermittently, and then moving to the next location. When samples have been taken along the full length of the PSR at that location, both crawlers move forward another distance, and the process repeats. The telescoping supports may need to be greater than 100 meters in extended length in order to allow for sufficient distance for sample collecting and excavation. Prior to moving laterally with respect to the transport and support cables, the telescoping supports may need to retract to allow the cable to move laterally. Once the telescoping supports are aligned with the crawlers, the telescoping supports may once again extend as explained earlier. A number of methods can ensure proper alignment, such as a laser or radio frequency harmonics.

A prospector system includes a traversing sampling payload system. The prospector sampler is a structure which is comprised of numerous components for performing the prospecting mission. The prospector structure can be of any shape; however, a cube may allow greater internal storage volume. Attached to the structure is a support column which can withstand the maximum loaded mass of the system. Attached to it is a pulley arrangement similar to those used on trams and ski lifts. The pulley arrangement rides on the support cable to enable the prospector system to be able to access the entire interior area of the lunar polar craters. Attached to a reusable lanyard in one embodiment is a penetrator with a removable sample pouch. The reusable lanyard passes through a solenoidal accelerating mechanism, and is connected to a winch capable of pulling the sample pouch out of the penetrator. The structure contains a penetrator storage container, and a sample pouch container. A robotic arm is used to remove the penetrators from the penetrator container, and affix a clasp to the top of the sample pouch (developed in the penetrator section), and will place the penetrator into the solenoid acceleration device. The transport cable is split into two parts, one for each crawler. This split feature allows substantial flexibility in obtaining samples. At each end of the split in the transport cable, is a magnetically susceptible puck. The puck has a companion puck mounted on the prospector structure which is a powered electromagnet. When it is time to attach the transport cable to the structure, the remote manipulator arm, which is comprised of articulating arms to which an end effector is attached, grasps the puck and holds it next to the electromagnet until the electromagnet is energized by the power supply, which generates electrical current to the puck, causing it to become a powerful electromagnet, ensuring the transport cable is firmly attached to the structure. This is the approach to enable the crawlers to accurately map out the craters. The sampler system winch and cable system is capable of accommodating a series of end effectors. One such end effector is the long-rod, hollow-tube penetrator.

The concept of operations is that a penetrator connects a lanyard, part of the winch cable to the removable boss attach point. Once this is accomplished, the penetrator is grasped by one of the remoted manipulator arms and is removed from the penetrator storage vault. The remote manipulator arm places the penetrator into the solenoid accelerator tube. Once the sample collector is in a desired position above the crater floor, an electrical current from the power supply is commanded into the solenoid. This causes the penetrator to be rapidly accelerated to ~50 m/sec. When the penetrator impacts the surface of the crater floor and enters the regolith, material is forced into the penetrator's sample pouch. When the penetrator stops, the end of the sample pouch is clamped off. A signal is sent to the sample collector's avionics suite, and the winch is activated pulling the sample pouch out of the penetrator. When the sample pouch enters the sample collector the lanyard is removed and the sample pouch is stored in the storage vault. Upon reaching one end or another of the sample collector's traverse across the crater, if the collector's penetrator inventory is exhausted, a remote manipulator on one of the crawlers removes the sample vault and the penetrator storage vault, and replaces the items with a new supply of penetrators. This process is continued until the crater floor has been mapped. The samples are cataloged and an initial sample analysis is carried out with results sent to a command center.

The primary end effector for taking samples is the long rod penetrator sampler. The penetrator tip means is made from a high density material such as tungsten, preferably single crystal tungsten, or depleted uranium. This material enables the penetrator to penetrate hard substances such as rocks or other solid materials. Testing may demonstrate that more conventional materials such as super-alloys may be substituted for the tip. The entire penetrator means is made from high strength super-alloys such as 4130 steel; this is to minimize buckling of the penetrator as it impacts the surface.

There is a lower tapered biconic boss means which provides a transition from the penetrator tip means to the sample pouch means. A sphincter means provides a mechanism for closing the open end of the sample pouch means prior to it being withdrawn so the sample isn't lost. A variety of sphincter means are feasible from a simple circumferential spring, to a tricuspid valve arrangement, up to an explosive squib to crush the tapered boss means to separate the lower conic from the upper pouch container. A variety of tips can be screwed into the end effector means of the penetrator means. The sample pouch means is a flexible pouch which is securely attached to the upper removable boss means and which is secured by friction to the inner opening of the upper part of the penetrator at the flared end. The removable boss means also provides the secure connection to the lower tether via means of six lanyards. The flexible sample pouch means is designed so that the pouch can be removed even if there is some deformation or buckling of the penetrator means. The flared end provides a means of stopping the penetrators means so that the removable boss means is not covered with regolith, preventing reclamation of the sample pouch. Since the solenoid launcher can vary the ejection speed, once the regolith is characterized, the penetration depth can be controlled.

Once the sample pouch is winched into the sampler station, one of the remote manipulator assemblies, grasps the sample pouch with its end effector and places the sample into the sample vault. Once this process is completed, the transport line moves the entire sampler station to a new point in the crater to obtain another sample.

The sample collecting sequence is tunable to the need of the situation. There will be a tradeoff between the number of samples to be taken compared to the area of the crater. For example, the Shakleton Crater is 21 km in diameter representing some 346 km2 surface area. With a sample separation distance of 1 km, this would still represent approximately double that number of penetrators and sample pouches to enable even a very coarse resource map.

The removable upper boss has several roles. It provides a means of securing the penetrator via lanyards to the sampler station tether. It is held in place within the penetrator by friction locks via rotating elliptical locks which are preset to a specific tension, which is many times the penetrator mass, so the penetrator will not be lost during operations, descent and impact, but many times less than the breaking strength of the individual lanyards. After the impactor has penetrated the objects surface, the winch begins to retract the lower tether, exerting tension on the lanyards, which are attached to the elliptical friction locks, contained within the friction lock slot, at the lanyard attach point which is offset from the friction lock pivot pin. This provides a mechanical advantage which rotates the friction lock so there is clearance between the friction lock and the side of the penetrator upper flare location. This allows the upper boss to be removed by tether tension. The sample pouch contains structural fibers which are embedded in the upper boss structure. The fibers provide the strength to withdraw the sample pouch from the penetrator. During withdrawal, the lower sphincter closes the open end of the pouch containing the sample. The upper opening of the pouch is sealed with a magnetic slug, which allows the entire sample pouch and upper boss to be handled in a zero-g or micro-g environment. Each magnetic slug is marked with a unique identifier which enables chain of custody for all samples. The sample pouch can contain solids, aggregates, liquids, powders, or sands.

The prospecting system is merely a means of characterizing the available resources. The ultimate objective is the extraction and beneficiation of these resources. If the prospecting appeared daunting, excavation will be even more of a challenge. For example, the Shakleton crater is 4.2 km deep at the deepest point. There are a number of terrestrial approaches which can be employed. For example, using the same sampler station, the winch and cable can be attached to a clamshell excavator. The clamshell jaws can be opened by a set of electromechanical cylinders which rotate the jaws about a bearing. After the jaws are opened, the winch releases its winch brake and the clamshell excavator is allowed to free-fall to the surface embedding the jaws into the PSR regolith. The electromagnetic actuators close the jaws, capturing the samples in a flexible leak-resistant pouch. The laden clamshell excavator is transported along the cable system until it reaches the crater rim, where the clamshell jaws are opened by the electro-mechanical actuators, and a remote manipulator grasps the filled pouch, and replaces it with an empty one. The pouch not only captures and seals the sample, but should also minimize the production of dust.

In another embodiment, a different excavation concept can be employed. This concept, a drag line excavator, like the clamshell excavator is widely used in terrestrial mining, surface modification, and dredging operations. The typical drag line excavator is comprised on a number of independent required items. The main item of the drag line excavator is a (typically) open-topped bucker consisting of an open front, a closed back and sides. Attached to the front of the drag line excavator is a hinged drag drawbar. This would be connected to one of the winch cables on the crawler. The opposing crawler's cable is attached to a grasp ring. Consequently, the drag line excavator can be moved anywhere along the support and transport cable raceways. The drag line leading edge contains jaw teeth used to break up hard surfaces. The pitch of the excavator can be adjusted by raising or lowering the rear of the excavator by connecting grasp to the sampler winch with the winch cable. The drag line is pulled along the crater floor until the bucket is full, at which time the sampler winch cable which is connected to both grasps, lifts the excavator off the crater floor. The drag line cables and the transport cable move the excavator to either crawler where its load is dumped and the process is continued.

Now referring to the figures, FIG. 1 is a block diagram showing a method for utilizing a terrain that may be used in one embodiment of the present invention. At 1001, two vehicles are provided, each with a mast. The mast consists of a shaft and an auger. At 1002, the augers auger into the ground, thereby stabilizing each of the masts against forces on each of the shafts by a support cable and a transport cable. At 1003, a support cable is extended between the two shafts. At 1004, a transport cable is extended between the two shafts. At 1005, support poles are attached to the support cable and the transport cable. At 1006, the support poles are passed down the support cable and the transport cable to a point or points between the two shafts. At 1007, the support poles are telescoped to extend until the support poles contact the terrain and thereby support the support cable and the transport cable. At 1008, a utilization device is passed along the support cable and the transport cable such that the utilization device travels to a desired point between the two shafts.

Figure 2:
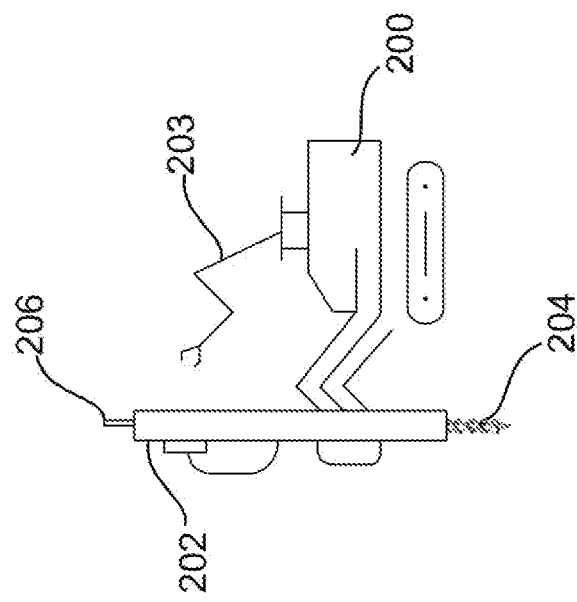
FIG. 2 is a schematic side elevation view showing a vehicle with mast and auger.

FIG. 2 is a schematic side elevation view showing a vehicle with mast and auger that may be used in one embodiment of the present invention. The vehicle comprises a main body 200 with internal counterweights and a mast 202. The mast has cable attachment points 206 on the top of the mast 202 and an auger 204 at the bottom of the mast 202. The augers are configured to drill or auger into the terrain and thereby stabilize the mast against forces on the cable attachment points 206 on the top of the mast shaft caused by cables attached to the vehicle. The vehicle also has a robotic arm 203 capable of moving support poles, as in FIG. 3, to and from the cables, in FIGS. 4-6.

Figure 3:
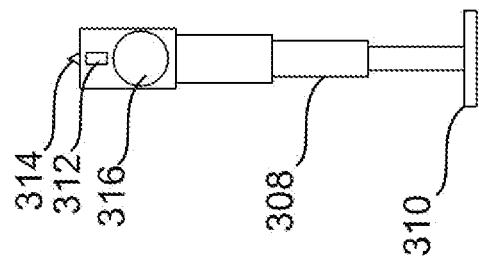
FIG. 3 is a schematic side elevation view showing a telescoping support pole.

FIG. 3 is a schematic side elevation view showing a telescoping support pole that may be used in one embodiment of the present invention. The support pole has telescoping sections 308 on top of a foot 310. A top of the pole has motors 312, a cable attachment 314, and a pulley 316. The motors 312 consist of motors for traversing cables via pulley 316 and motors for extending and retracting the telescoping sections 308. The cable attachment 314 is capable of opening and closing to attach to a cable.

FIG. 4 is a cutaway side view of a crater with two of the vehicles of FIG. 2 that may be used in one embodiment of the present invention. FIG. 5 is the cutaway side view of FIG. 4 with a set of cables spanning between the two vehicles. FIG. 6 is the cutaway side view of FIG. 5 with the telescoping support poles of FIG. 3 and an exploration device. In this embodiment, the two vehicles 400 move to opposite sides of the crater 420 and attach themselves to the rim of the crater 420 with their augers. Two cables 530 (transport cable 532 and support cable 534) are then spanned between the top of the two vehicles' 400 masts. In one embodiment, the cables 530 are flown from vehicle to vehicle and attached by drones. In another embodiment, the cables 530 are attached to each mast before the vehicles 400 separate and traverse the rim of the crater 420. This latter instance is of more importance for the case where the crater 420 is on an airless surface, such as the moon. In another embodiment, the cables 530 are attached to one vehicle and then the other end of the cables are launched kinetically across the crater 420 to reach the other. In all embodiments, the cables 530 are longer than the span from vehicle to vehicle, as necessitated by what is shown in FIG. 6.

The transport cable 532 is used by the pulleys of the telescoping support poles 608 to traverse into the crater 420. The support cable 534 provides a second means of support by attachment to the cable attachment of the telescoping support poles 508. Both cables are capable of conducting electricity in a controlled manner.

Telescoping support poles 608, as from FIG. 3, are sent across the cables 530, their weight and a release of tension from one of the vehicles, allowing them to sink into the crater 420. As each telescoping support pole 608 reaches a location where support is needed, the pole 608 extends to rest its foot against the crater surface 420 and thereby support the cables 530. Once sufficient support poles 608 are in place, scientific or other devices, such as transport 640, can traverse the cables 530 to utilize the terrain. In one instance, transport 640 carries scientific instruments for studying the surface of the crater 420. In other instances, the transport 640 carries small rovers that dismount the transport 640, traverse the floor of the crater 420, then return to the transport 640 to recharge, offload samples, transmit data, or similar. In other instances, the transport 640 carries a penetrator system for launching objects into the crater 420 to expose deeper layers. In other instances, the transport 640 carries drills for penetrating deeper into the crater 420 and uncovering further information.

FIG. 7 is a schematic top view of the crater of FIG. 4 with a power plant that may be used in one embodiment of the present invention. The vehicles 400 of FIGS. 4 through 6 are located on two edges of the crater 420 and have cables 530 spanning the crater 420. A power cable 742 runs from a remote power plant 740 to the vehicles, directly connecting to one of the vehicles 400 and indirectly to the other vehicle 400 through the cables 530. In one embodiment, the power plant is a nuclear reactor. In another embodiment, the power plant consists of solar panels. In terrestrial applications, the power plant may consist of any typical power production system.

In some embodiments, the terrain is selected from the group consisting of rugged terrain, hostile terrain, terrain at cryogenic temperatures, terrain on another planetary body, and combinations thereof.

In some embodiments, the utilization device is configured to detach from the support cable and the transport cable to utilize the terrain. In some embodiments, the utilization device carries out prospecting activities on the terrain. In some embodiments, the utilization device comprises a penetrator configured to launch a reusable penetrator into the terrain and retrieve samples from the reusable penetrator for return to a laboratory.

In some embodiments, the support cable and the transport cable are configured to conduct electricity to provide power to the utilization device. In other embodiments, the utilization device operates on batteries or other self-carried power.

In some embodiments, the utilization device is a drag line excavator configured to travel along a top of the terrain and remove a portion of the terrain.

The invention has been described with reference to various specific and preferred embodiments and techniques. Nevertheless, it is understood that many variations and modifications may be made while remaining within the spirit and scope of the invention.

The invention claimed is:

1. A system for prospecting, excavating, mining, processing, surveying, and combinations thereof, terrain comprising:
   two vehicles configured to traverse terrain to two locations, the two vehicles each comprising a mast, the mast comprising a shaft and an auger;
   each of the augers configured to auger into the terrain and thereby stabilize each of the masts against forces on each of the shafts by a support cable and a transport cable;
   the support cable configured to extend between the two shafts;
   the transport cable configured to extend between the two shafts;
   support poles carried by the two vehicles, and configured to attach to the support cable and the transport cable, travel along the support cable and the transport cable to a desired location where the support poles telescope until the support poles contact the terrain, whereby the support poles provide support to the support cable and the transport cable; and
   one or more devices configured to travel the support cable and transport cable and further configured to prospect, excavate, mine, process, survey, and combinations thereof, the terrain.

2. The invention of claim 1, further comprising a remote nuclear reactor configured to provide electrical power to the two vehicles via wires.

3. The invention of claim 1, wherein the two vehicles comprise a plurality of motors.

4. The invention of claim 1, the two vehicles further comprising one or more robotic arms configured to attach the plurality of support poles to the support cable and the transport cable.

5. The invention of claim 1, wherein the terrain is selected from the group consisting of terrain at cryogenic temperatures, terrain on another planetary body, and combinations thereof.

6. The invention of claim 1, wherein the one or more devices are configured to detach from the support cable and the transport cable to prospect, excavate, mine, process, survey, and combinations thereof, the terrain.

7. The invention of claim 1, wherein the one or more devices comprise a penetrator configured to launch a reusable penetrator into the terrain and retrieve samples from the reusable penetrator for return to a laboratory.

8. The invention of claim 1, wherein the support cable and the transport cable are configured to conduct electricity to provide power to the utilization device.

9. The invention of claim 1, wherein the one or more devices are a drag line excavator configured to travel along a top of the terrain and remove a portion of the terrain.

10. A method for prospecting, excavating, mining, processing, surveying, and combinations thereof, a terrain, comprising:
    providing two vehicles comprising a mast, the mast comprising a shaft and an auger;
    augering into the ground with the augers, thereby stabilizing each of the masts against forces on each of the shafts by a support cable and a transport cable;
    extending a support cable between the two shafts;
    extending a transport cable between the two shafts;
    attaching support poles to the support cable and the transport cable;
    passing the support poles down the support cable and the transport cable to a point or points between the two shafts;
    telescoping the support poles to extend until the support poles contact the terrain and thereby support the support cable and the transport cable;
    passing one or more devices along the support cable and the transport cable such that the one or more devices travel to a desired point between the two shafts; and prospecting, excavating, mining, processing, surveying, and combinations thereof, the terrain with the one or more devices.

11. The method of claim 10, further comprising providing electrical power to the two vehicles via wires from a remote nuclear reactor.

12. The method of claim 10, wherein the two vehicles comprise a plurality of motors.

13. The method of claim 10, wherein the two vehicles comprise one or more robotic arms, and further comprising attaching the plurality of support poles to the support cable and the transport cable by the one or more robotic arms.

14. The method of claim 10, wherein the terrain is selected from the group consisting of terrain at cryogenic temperatures, terrain on another planetary body, and combinations thereof.

15. The method of claim 10, wherein the utilization device detaches from the support cable and the transport cable to utilize the terrain.

16. The method of claim 10, wherein the one or more devices carry out prospecting activities on the terrain.

17. The method of claim 10, further comprising conducting electricity through the support cable and the transport cable to provide power to the one or more devices.

18. The method of claim 10, wherein the one or more devices are a drag line excavator traveling along a top of the terrain and removing a portion of the terrain.

19. A system for prospecting terrain comprising:
two vehicles configured to traverse terrain to two locations, the two vehicles each comprising a mast, the mast comprising a shaft and an auger;
each of the augers configured to auger into the terrain and thereby stabilize each of the masts against forces on each of the shafts by a support cable and a transport cable;
the support cable configured to extend between the two shafts;
the transport cable configured to extend between the two shafts;
support poles carried by the two vehicles, and configured to attach to the support cable and the transport cable, travel along the support cable and the transport cable to a desired location where the support poles telescope until the support poles contact the terrain, whereby the support poles provide support to the support cable and the transport cable; and
one or more devices configured to launch a reusable penetrator into the terrain and retrieve samples from the reusable penetrator for return to a laboratory.

* * * * *